United States Patent [19]

Le Comte

[11] Patent Number: 5,070,516
[45] Date of Patent: Dec. 3, 1991

[54] METHOD AND APPARATUS FOR REDUCING NOISE ON A SIGNAL ENCODABLE ON A PLURALITY OF PREDETERMINED LEVELS

[75] Inventor: Michel L. Le Comte, Bures s/Yvette, France

[73] Assignee: JS Telecom, Louveciennes, France

[21] Appl. No.: 496,789

[22] Filed: Mar. 21, 1990

[30] Foreign Application Priority Data

Mar. 28, 1989 [FR] France ............... 89 04017

[51] Int. Cl.$^5$ .................................. H04B 1/10
[52] U.S. Cl. ............................. 375/102; 375/103; 328/149; 364/724.01
[58] Field of Search ............... 375/10, 17, 99, 102, 375/103; 328/146, 147, 149, 150; 330/124 R, 149; 364/724.01; 341/200

[56] References Cited

U.S. PATENT DOCUMENTS

| | | | |
|---|---|---|---|
| 4,317,080 | 2/1982 | Acker | 328/151 |
| 4,375,037 | 2/1983 | Ikushima | 328/147 |
| 4,766,600 | 8/1988 | Martin | 375/10 |
| 4,816,769 | 3/1989 | Ma et al. | 375/99 |
| 4,823,360 | 4/1989 | Tremblay et al. | 375/10 |
| 4,835,790 | 5/1989 | Yoshida et al. | 375/10 |

FOREIGN PATENT DOCUMENTS

0157598 10/1985 European Pat. Off. .
3043372 6/1982 Fed. Rep. of Germany .

Primary Examiner—Benedict V. Safourek
Assistant Examiner—Young Tse
Attorney, Agent, or Firm—Rines and Rines, Shapiro and Shapiro

[57] ABSTRACT

The invention relates to filtering a periodic digital signal having N logic levels and having noise superposed thereon. The instantaneous probability of existence of each of these logic levels is converted into a corresponding one of N signals each having its own maximum amplitude when the modulated value of the received instantaneous signal is equal to the normal value for a corresponding logic level, which amplitude falls off by application of a weighting coefficient as the received instantaneous value moves away from the normal value of that logic level. The signal relating to each looked-for logic level is integrated over the duration of an elementary modulation period in the received digital signal, and the recognized logic level is the level corresponding to the largest value integral.

12 Claims, 7 Drawing Sheets

METHOD AND APPARATUS FOR REDUCING NOISE ON A SIGNAL ENCODABLE ON A PLURALITY OF PREDETERMINED LEVELS

The invention relates firstly to a method of reducing noise affecting a digital signal transmitted at a fixed frequency and encodable on a plurality of possible quantized levels, the method operating by filtering the signal disturbed by noise, and then by integrating the filtered signal during each elementary code period.

BACKGROUND OF THE INVENTION

The sensitivity of a receiver is generally limited by the presence of noise induced on the transmission medium from the signal transmitter, and also in the amplifier circuits of the receiver. The noise of the input stage of an opto-electronic receiver for an optical fiber link sets a limit on the range of the link. One of the known ways of guarding against noise is to protect the transmission medium as much as possible, using electronic components having low noise levels, and making use of a filter for eliminating frequencies in the, or each, band where there cannot be any signal (or where there is only a residual fraction thereof). Another technique consists in reducing the modulation rate of the encoded signal, thereby improving the signal-to-noise ratio but setting a limit on transmission performance. However, the noise present in the signal frequency band is not eliminated.

The present invention seeks to reduce noise, for example in order to increase the possible range of a link, in cases where the signal is an encoded signal transmitted at a fixed modulation frequency.

SUMMARY OF THE INVENTION

To this end, according to the invention, the noisy signal is subjected to amplitude filtering which, for each filter path relating to each quantized signal level, enhances amplitudes close to the quantized level under consideration to the detriment of amplitudes which differ therefrom, by too much or by too little. The term "amplitude" is to be considered herein in the broad sense of "value" of some physical parameter that can be encoded over a plurality of levels. Thus, the term embraces not only amplitude in the ordinary sense of the word, but also frequency, phase, or any other modulatable state or combination of states of a physical parameter.

By virtue of this disposition, any noise components superposed on the signal and changing its instantaneous amplitude (corresponding during each elementary code period to one of the quantized levels that the signal may occupy) are attenuated relative to said level, thereby improving the signal-to-noise ratio. In particular, in the event of short-duration interference of large amplitude briefly masking the useful signal, only some fraction of the interference as determined by the amplitude filtering law is subjected to integration. Due to its reduced residual energy, the effect of the interference after integration is considerably reduced.

More particularly, the filtering consists in applying a weighting coefficient to the signal during its fluctuations about the quantized level, with the weighting coefficient being maximal for an amplitude equal to said quantized level or close thereto, and decreasing as the amplitude moves either up or down away from said level, and in subjecting the resulting signal to integration over each elementary period. The signal is applied to a set of as many parallel-connected filtering and integration circuits as there are quantized levels. The code level retained at the end of each elementary period is that one for which the result of the integration is the highest among those corresponding to the various different quantized levels.

The weighting coefficient preferably varies as a function of the amplitude of the signal, following a curve which is upwardly concave on either side of the maximum value, with a small constant level in the vicinity of the maximum.

It is also desirable for the weighting coefficient relating to a given quantized level to be close to its minimum value for instantaneous signal amplitudes which are closer to another quantized level.

The invention also provides apparatus for implementing the above-defined method. This apparatus comprises:

as many amplitude filtering circuits to which the disturbed signal is applied as there are quantized levels, each circuit comprising an amplifier whose response curve as a function of input amplitude has a maximum for the input amplitude equal to the quantized level under consideration with a small fixed-value level around said maximum, and falling off monotonically on either side of the maximum;

integrator circuits for integrating the signals from said amplifiers, each being associated with a corresponding one of the filter circuits; and a comparator circuit comparing the set of integrated signals and specifying, at the end of each elementary signal period, the most probable code level of the signal during said period.

The apparatus preferably also includes two auxiliary circuits producing two reference voltages acting as logic level followers, which voltages are applied to the amplifier in each filter path. These reference voltages serve to servo-control the reference levels of the various quantized signal levels to slow variations in level due to transmission.

In a preferred embodiment, the amplifier in each filter circuit comprises:

a first non-linear amplifier having gain which is zero and then increases with ever-increasing slope as the input amplitude rises from one half to the full value of the quantized level under consideration;

a second non-linear amplifier whose gain decreases with ever-decreasing slope when the input amplitude rises above the value of the quantized level under consideration;

said first and second non-linear amplifiers both receiving the signal to be filtered; and a gain-controlled amplifier having its signal input connected to receive the output from the first non-linear amplifier and having its gain control input connected to receive the signal from the second non-linear amplifier; the amplitude filtered signal being available at the output from the gain-controlled amplifier, with the respective reference voltages or a fraction thereof being preferably applied to the second non-linear amplifiers of each filter path.

The integrator circuit comprises a plurality of integrators, each receiving the output from the corresponding filter circuit. In one variant of the invention applicable to a binary-encoded signal, the integrator circuit may be constituted by a single integrator common to both filter paths and symmetrically actuated in opposite directions by the output signals therefrom, with the comparator circuit comparing the signal from said integrator with a rest voltage to which said integrator is initialized at the beginning of each elementary period.

The apparatus may also include a circuit for adding an error-correction voltage to the signal to be filtered, said error-correction voltage being proportional to the most recent observed difference between the ideal quantized amplitude and the true amplitude (after HF filtering), for each quantized level of the signal, which errors are determined by subtractor means, and the error-correction voltage offsetting the signal in a manner that tends to reduce the amplitude of the errors during the following period.

BRIEF DESCRIPTION OF THE DRAWINGS

Embodiments of the invention are described by way of example with reference to the accompanying drawings, in which.

DETAILED DESCRIPTION

Figure 1:
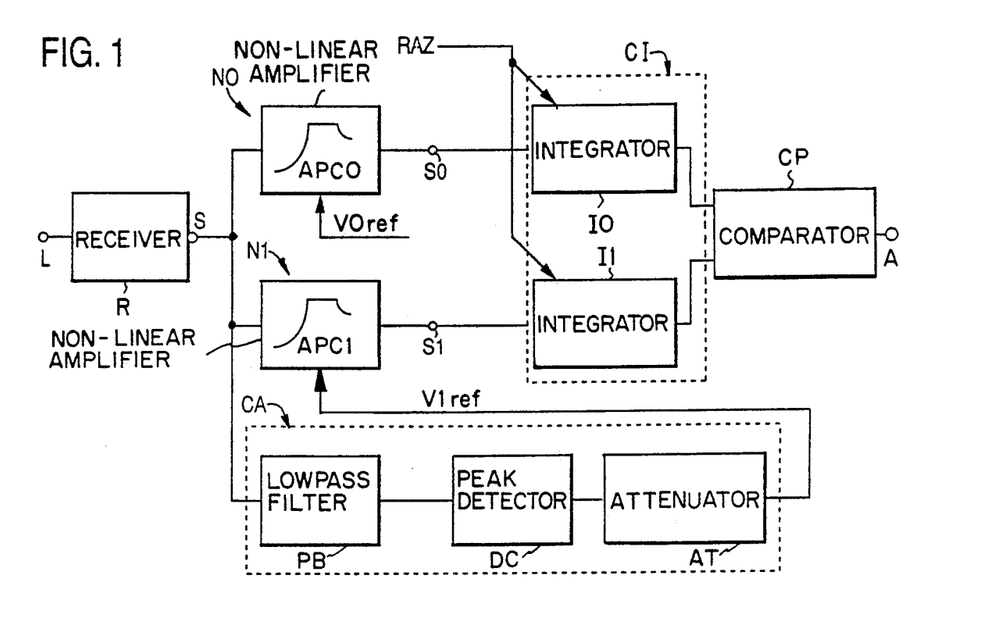
FIG. 1 is a block diagram showing the general organization of a noise-reducing circuit of the invention, for a signal having two code levels.
Figure 2:
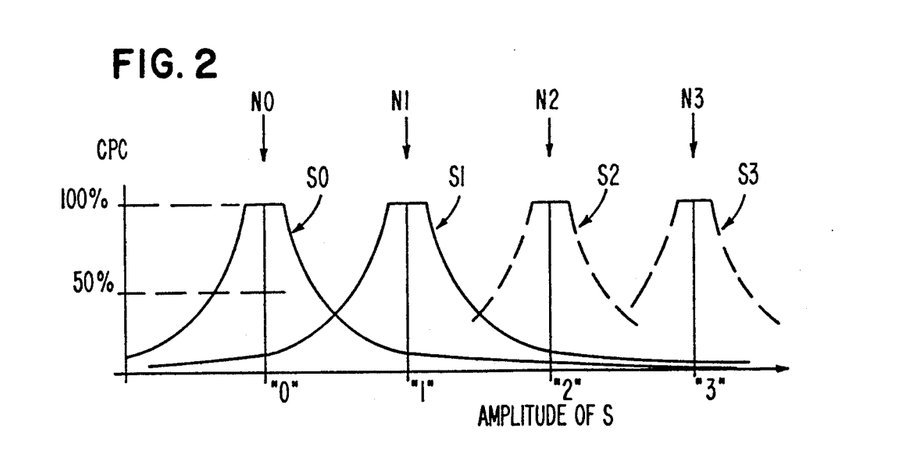
FIG. 2 shows the amplitude/amplitude response curves of various filter paths in the circuit of FIG. 1.

FIG. 1 shows a receiver R which delivers a coded signal S as received from a transmission path L, the signal being modulated at a fixed rate and capable of taking up two voltage levels corresponding to logic levels 0 and 1 of the coded message conveyed by the signal S. In practice, this signal is disturbed by various forms of noise and interference, and it is necessary to reduce the influence thereof on the accuracy with which the levels 0 and 1 are recognized. To this end the signal S is applied to a first path N0 for recognizing level "0" and to a second path N1 for recognizing level "1". Each of the paths Ni, i.e. N0 and N1, comprises a non-linear amplifier APCi which provides maximum gain at the recognition level (0 or 1) of the path in which it is included, with the gain falling off as the amplitude of the signal S moves away from said level, either up or down. Each amplifier APCi thus constitutes an "amplitude filter" enhancing a given input level over all other levels, and which applies a "weighting coefficient" CPC to the signal S, which coefficient varies as a function of the amplitude of the signal. As shown in FIG. 2, the coefficient is 100% at the level (0 or 1) to be recognized, and falls off on either side of said level, initially steeply and then less steeply following two curves which are upwardly concave.

The output signal Si from each path amplifier APCi is applied to a respective integrator Ii in an integration circuit CI, which integrator sums the continuing succession of quantities of electricity received from the corresponding amplifier APCi, which quantities are proportional to the various successive amplitudes taken by the signal Si over the duration of an elementary period. The integrators Ii are reset to zero by a pulse RAZ at the beginning of each elementary period in the signal S, as determined by a local clock (not shown) which is servo-controlled to the received signal for synchronous transmission, or which is derived from confirmed changes in state for an asynchronous transmission. The output terminals from the amplifiers are connected to a comparator CP whose output A delivers a signal "0" or "1" depending on which one of the integrators in channels N0 and N1 is providing a result greater than the other integrator, i.e. which one of them has taken on most charge from its rest state. The time constants of the two paths are identical so as to make a comparison between the received levels valid.

The signal S is also applied to an auxiliary circuit CA comprising in succession: a lowpass filter PB, a peak detector DC, and an attenuator AT, which auxiliary circuit delivers a reference voltage Vlref equal to level "1" in the signal S, and this signal is applied as a threshold to the amplifier APC1 in order to set the drop-off point of the signal. The amplifier APC0 receives logic level "0" (Voref) which is assumed to be equal to 0 volts in this example.

When the signal S may take up more than two quantized levels, it is applied to a corresponding number of paths N0, N1, N2, . . . having amplitude filter curves which are offset from one another (FIG. 2), with each path comprising a non-linear amplifier APCi which receives a reference voltage equal to the corresponding logic level via a corresponding attenuator ATTi, and an integrator Ii which is periodically reset to zero by a signal RAZ at the beginning of each elementary period, with the output terminals of the integrator Ii being connected to a comparator CP which compares their respective integration voltages in order to deliver the logic level corresponding to the preponderant result at its output A.

Figure 3:
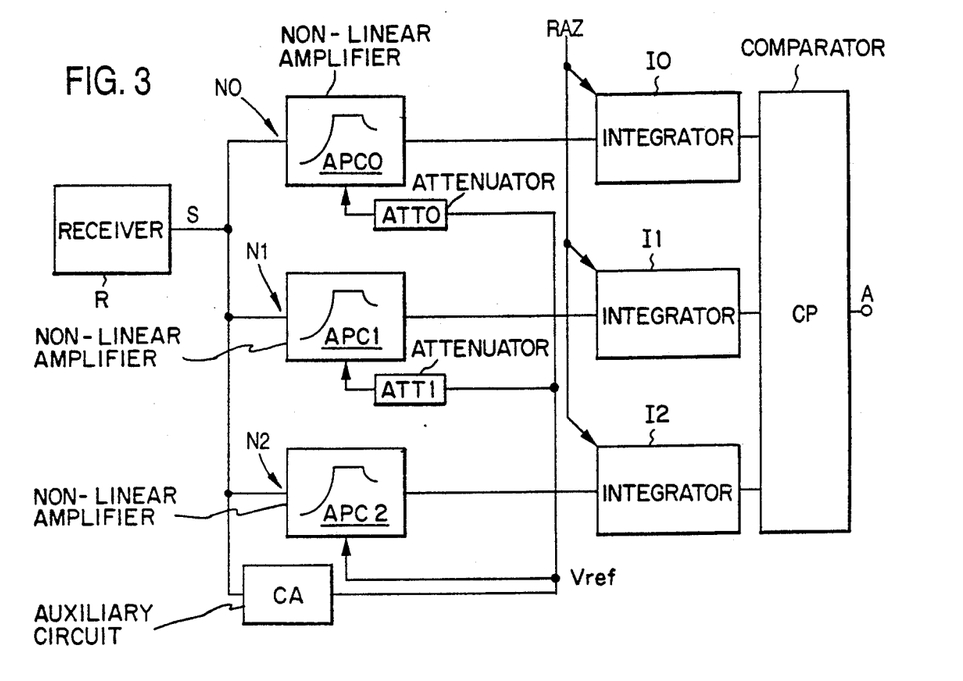
FIG. 3 is a block diagram similar to FIG. 1 of a circuit of the invention suitable for a signal having three code levels.

FIG. 3 shows an example of such an arrangement for a signal S having three possible levels.

The comparator is preferably constituted by a tree of two input analog comparators, each providing a signal "0" or "1" depending on which of its inputs has the higher value. These bits control respective switches receiving the same pairs of values and forwarding the higher value signal to their outputs. These outputs are fed to a second layer of comparators and switches operating in the same manner, and so on until only the highest level signal is available.

Figure 4:
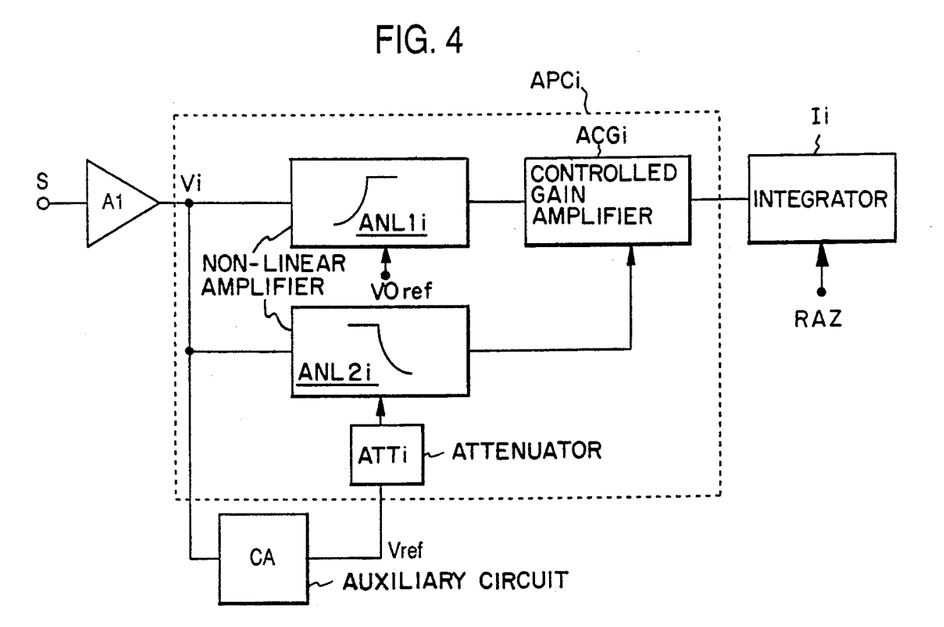
FIG. 4 is a block diagram showing the structure of one of the amplitude filter paths in the circuit of FIG. 1.

FIG. 4 shows the structure of one of the amplifiers APCi which comprises a first non-linear amplifier ANL1i whose gain increases as the amplitude of its input signal increases up to a quantized level applicable to the path in question, with the amplifier ANL1i being followed by an amplifier ACGi having a gain control input, the amplifier APCi further including a second non-linear amplifier ANL2i whose gain falls off when the amplitude of its input signal increases beyond the quantized level, with the inputs of the non-linear amplifiers ANL1i and ANL2i receiving the signal Vi corresponding to the signal S, after amplification or attenuation in an amplifier A1 for adjusting its level for processing in circuits downstream therefrom. The amplifier ACGi is connected to the output of the amplifier ANL1i while its gain is controlled by the output signal from the amplifier ANL2i. The amplifier ANL2i also receives a fraction of the reference voltage Vref provided by the circuit CA on the basis of the signal S (FIG. 1) and after passing an attenuator ATTi, and the amplifier ANL1i receives 0 volts corresponding to logic level "0". When there are more than two quantized levels, intermediate quantized levels are delivered by a multi-output divider bridge fed at one end with the lowest voltage obtained from a negative peak detector and at its other end with Vref from the positive peak detector.

Figure 5:
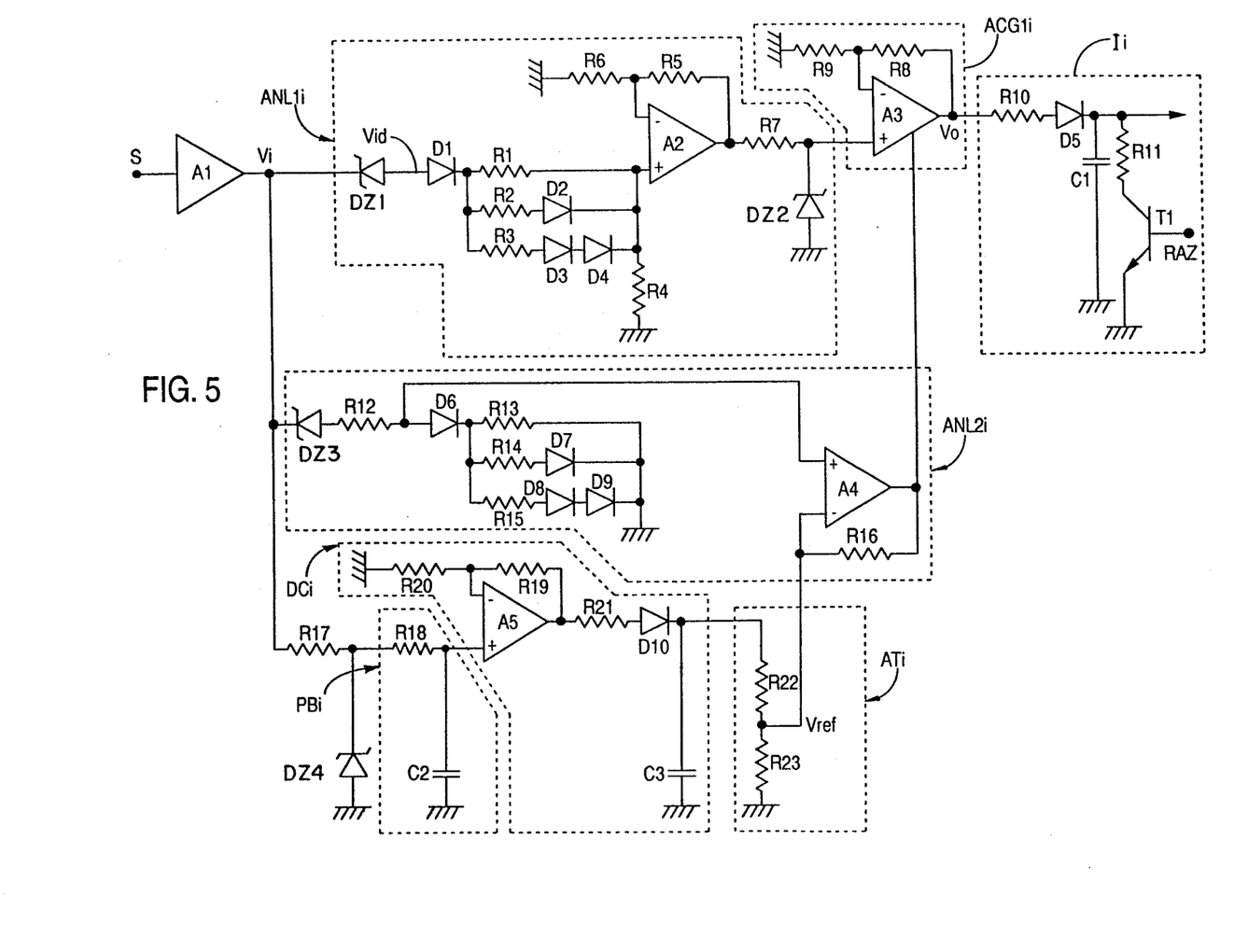
FIG. 5 is a detailed circuit diagram of the amplifier in one of the filter paths of a circuit of the invention.

By way of example, FIG. 5 is a detailed circuit diagram of an amplifier APCi. An amplifier A1 receives the signal S and provides a proportional signal Vi which is applied in parallel to the two amplifier chains constituting the amplifier APCi and corresponding respectively to the amplifiers ANL1i and ANL2i, and also to the circuit CA as shown in FIG. 4.

The first chain includes a zener diode DZ1 and a diode D1 connected in series, with the cathode of the diode D1 feeding the input of a two-pole net constituted by the following parallel-connected branches of components in series: resistor R1; resistor R2 and diode D2; and resistor R3 and diodes D3 and D4. Each of these branches (which need not be limited to 3 in number) has one more diode than the preceding branch. At the output from the two-pole network, there is a resistor R4 connected to ground and a connection to the non-inverting input of an amplifier A2 having negative feedback applied via resistors R5 and R6. The output from the amplifier A2 is applied, via a series resistor R7 connected to a cathode of a zener diode DZ2 whose anode is grounded, to the non-inverting input of an amplifier A3 having a gain control input, and corresponding to the amplifier ACGi of FIG. 4 with the output therefrom providing a signal Vo.

The second chain, corresponding to the amplifier ANL2i of FIG. 4, comprises a zener diode DZ3 and a resistor R12 connected in series, with the resistor R12 connected both to the non-inverting input of an amplifier A4 and, via a diode D6, to a two-pole network having three branches: R13; R14 and D7; and R15, D8, and D9, constituting together therewith a nonlinear voltage divider providing the signal which is applied to the non-inverting input of the amplifier A4.

The inverting input of amplifier A4 is connected to the amplifier output via a feedback resistor R16 and receives a reference voltage Vref at logic level "1" as delivered by the auxiliary circuit which comprises an amplitude-limiting cell constituted by a resistor R17 and a zener diode DZ4, a lowpass filter cell constituted by a resistor R18 and a capacitor C2, and an amplifier A5 whose gain is set by resistors R19 and R20. Via a series resistor R21, this amplifier feeds a peak detector constituted by a diode D10 and a capacitor C3, and the output voltage therefrom as attenuated by a resistive divider bridge R22, R23 constitutes the reference voltage Vref which is equal to logic level "1".

The output from the amplifier A3 is fed to an integrator circuit corresponding to the integrator Ii, and constituted by a series resistor R10, a diode D5, and a capacitor C1 which is shunted by a fast discharge circuit for the capacitor constituted by a low resistance resistor R11 in series with a transistor T1 controlled by the reset to zero signal RAZ.

In operation, the signal S is transformed, after amplification, into a signal Vi whose amplitude is zero when the logic level is "0" and is equal to 3 volts, for example, when the logic level is "1", assuming there is no interference disturbing the signal. The automatic gain control circuits of the receiver R ensure that the signal Vi is at substantially constant amplitude when at the state "1" independently of amplitude fluctuations in the signal transmitted to the receiver.

If too high a variation in the level at the output from the amplifier A1 is feared in spite of the automatic gain control provided thereby, it would be necessary to servocontrol the threshold voltages provided by DZ1 and DZ3 to slow variations in the received level. To do this, each of these zener diodes could be replaced by a corresponding amplifier AZ2 and AZ3 (not shown) having unity gain if no change is to be made to the remainder of the chain, and receiving the signal Vi on the noninverting input and the signal Vref/2 or Vref as the case may be on the inverting input. When the signal Vi exceeds one half the logic level "1", AZ1 reproduces the variations of Vi; similarly, AZ3 reproduces the variations of Vi beyond Vref, which corresponds to level "1".

Returning to FIG. 5, a voltage Vid appears at the output of the zener diode DZ1, which voltage is offset by the nominal voltage of the zener diode, and this voltage is selected to be equal to one half the normal difference between levels "0" and "1" in the signal Vi, i.e. 1.5 V in the present example. The voltage Vid is zero so long as Vi is less than 1.5 V. As the voltage Vid increases above zero, the diode D1 conducts once its threshold voltage (0.4 volts) is reached, after which the branches of the non-linear two-pole network start conducting in succession, each time the amplitude at the terminals of R1 increases by 0.4 volts. As a result, the voltage at the input to the amplifier A2 increases more and more quickly following a curve which is upwardly concave. This voltage is amplified by the amplifier A2, and then after clipping by the zener diode DZ2 as the input signal exceeds the normal value for level "1", it is applied to the amplifier A3. This clipping sets a limit on the increasing gain curve provided by the first chain.

If Vi were to continue to increase beyond normal level "1" in the absence of clipping, then it would be the second chain that ensured that the amplitude of the output signal from the amplifier A3 fell off by virtue of its action on the gain control input to the amplifier A3. The amplifier A4 of this chain receives 0 voltage for Vi less than the zener voltage of DZ3, and at higher voltages it receives signal Vi reduced by the zener voltage of DZ3, with said zener voltage being equal to the amplitude of logic level "1" (3 volts). The branch of the non-linear two-pole network formed by the diode D6 and the resistor R13 then begins to conduct followed by the second and third branches in that order as the amplitude of Vi continues to increase. As a result, the voltage applied to the input of amplifier A4 increases more slowly than Vi. As for the other input of the amplifier it receives the voltage Vref delivered by the auxiliary circuit on the basis of the signal Vi, and this voltage is equal to the normal voltage between the levels "0" and "1" of this signal (3 volts). Thereafter, the amplifier A4, which acts as a threshold comparator, applies a variable voltage to the gain control input of the amplifier A3 causing its gain to drop, such that its output voltage Vo falls off in accordance with a curve which is upwardly concave, with the gain control signal varying more slowly with increasing distance of Vi from the quantized level under consideration. In order to simplify the explanation, it is assumed that the amplifier A3 has a linear relationship between its gain control and its output. If an amplifier is used for A3 in which the sensitivity of its output to its gain control decreases, then the variable attenuator including R13 could be omitted.

In summary, when the amplitude of Vi increases beyond zero, Vo remains zero until Vi reaches one half the normal value Vref of level "1", after which it increases substantially exponentially from zero to a maximum (e.g. 5 volts) as Vi increases from Vref/2 to Vref, after which it decreases substantially exponentially from the maximum to close to zero as Vi exceeds Vref.

Figure 6:
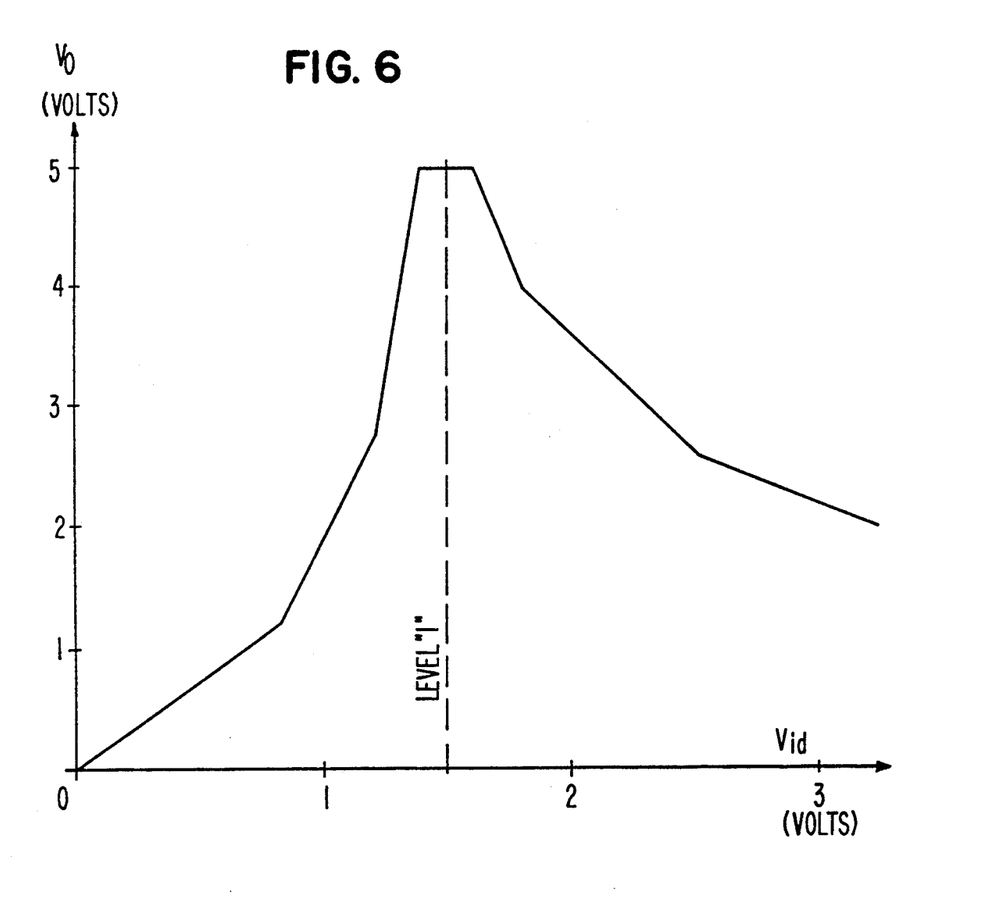
FIG. 6 is the amplitude/amplitude response curve of the FIG. 5 amplifier.

FIG. 6 shows one example of the amplitude/amplitude response curve that can be obtained using a circuit such as that shown in FIG. 5. The voltage Vo output by the amplifier A3 initially increases as a function of the voltage Vid, along three rectilinear segments of increasing slope (due to the nonlinear amplifier ANL1i), then after a horizontal plateau centered on the value of Vid corresponding to logic level "1" in the signal S (due to the clipping caused by the zener diode DZ2), the output falls off following three other rectilinear segments of decreasing slope due to the action of the nonlinear amplifier ANL2i on the controlled gain amplifier A3.

The voltage Vo is used for charging the capacitor C1 in the integrator Ii, using a current proportional to voltage, over a period of time equal to one period in the signal S. At the end of the period, the integrated voltage is read and stored in a bistable device D (not shown) after which the capacitor is discharged by applying the signal RAZ to the transistor T1, with the signal RAZ being constituted by a short positive pulse delivered by a time base circuit phase-synchronized to the receive clock of the signal S. At the end of each period, the voltage across the terminals of the capacitor C1 is representative of the quantity of electricity which it has received, with the charging current being proportional to the degree of correlation that exists between the logic level with which the amplitude filter path under consideration is associated and the instantaneous amplitude of the received signal S, together with its interferring noise.

The amplitude filter circuit for a given logic level, as shown in FIG. 5, may be adapted to detecting an arbitrary logic level. By appropriately choosing the zener diodes DZ1 and DZ3, the detection thresholds between adjacent levels and the beginning of the drop in the response curve after the top plateau can be adjusted respectively, with the drop off slope being adjustable by modifying the gain of the amplifier A4, taking account of the sensitivity of the gain control input to the amplifier A3 and the attenuation of the non-linear divider bridge placed at the input to the amplifier A4. When one of the logic levels is encoded by a physical level that gives a "zero" voltage, this level is arbitrary and may be offset by adding a DC voltage to the amplifier. It is thus possible to provide for all of the logic level detectors to be preceded by respective DC level offset or translation circuits bringing all of the detection paths into the same operating range, in which case the zener diodes DZ1 and DZ3 all have the same voltage levels in each of the paths. This provides the advantage of all paths being absolutely identical, and thus having the same integration constants.

Figure 7:
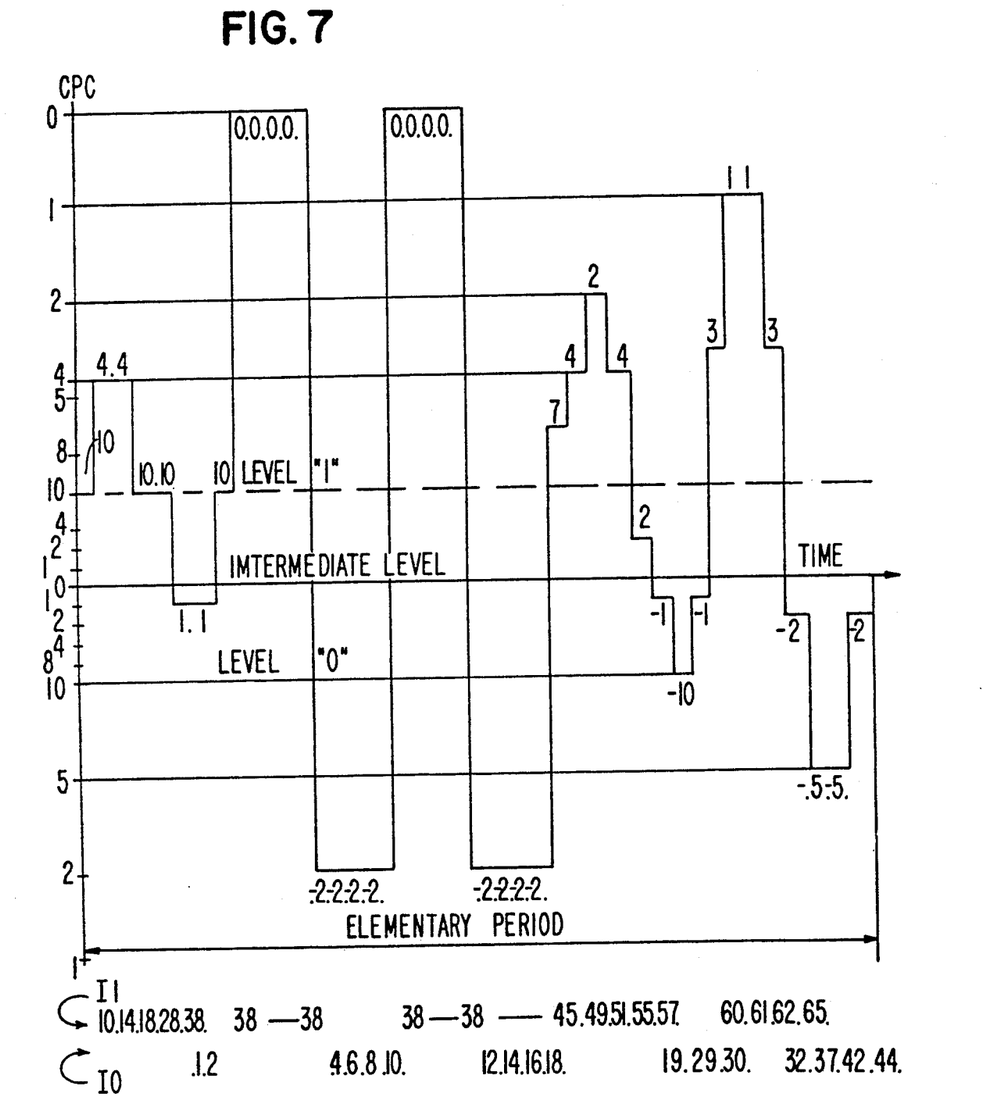
FIG. 7 is a diagram showing the behavior of the circuit of the invention in the presence of a useful signal in the presence of noise.

The diagram of FIG. 7 shows one example of a logic level "1" during an elementary period of a binary signal S, which period has five pairs of interfering AC pulses of various amplitudes superposed thereon. The weighting coefficient is marked up the Y axis by an arbitrary number increasing from 0 to 10 (maximum) from an intermediate level up to the true level for logic level "0" (or "1"), and dropping off beyond that level, with the weighting laws being symmetrical for both logic levels.

The signal S is highly disturbed by AC noise. For purposes of simplification, the noise is assumed to be clipped by the receiver when it is very large in amplitude, in which case it can be assumed to be constituted by a pair of oppositesign rectangular pulses. When the noise is in the form of a lower-amplitude sinewave, it is assumed to be constituted by a succession of discrete levels. The elementary period has been decomposed for this purpose into 40 elementary instants, each having its own level of noise. The first example consists in assuming that the signal S is theoretically at logic level "1".

The signal S whose initial amplitude is exactly at level "1" is initially weighted with the maximum coefficient of 10. Thereafter, the first positive interfering pulses cause it to move into a zone where the coefficient 4 is applied thereto. Thereafter it returns to normal level "1", and passes to the other side of the intermediate level where it is taken into consideration by the other path N0 associated with logic level "0", a given a coefficient −1 (with the minus sign being used to indicate that the other path is concerned), after which it returns to normal level "1". This process continues throughout the duration of the elementary period of the signal S corresponding to the level "1", and the integrators Ii of the paths N0 and N1 accumulate successive electrical charges as indicated at the bottom of the figure, where the cumulated count is shown. At the end of the period, the integrator I0 for the path N0 has reached the number 44 while the integrator I1 for the path N1 has reached the number 65, giving a ratio of 65/44=1.5. As a result, the comparator CP (FIG. 1) indicates that a level "1" is present in the signal S, in spite of the very large disturbances to which the signal is subjected.

A second example consists in assuming that a logic level "0" was transmitted with the same noise. For this example, it suffices to invert the vertical axis of FIG. 7 with the "intermediate level" remaining unchanged, and with the references to "level 0" and "level 1" being interchanged. It can thus be seen that under these conditions the level "0" path reaches a count of 65 compared with 44 for the "1" path.

In contrast, consider the example of a conventional clipped integrator which does not apply the present invention and which is constituted by a single linear amplifier followed by an integrator, and having a dynamic range for its input varying from 0% to 150% of the quantified level "1". The same interference applied to a logic level "0" gives 201 at the end of integration which exceeds the decision threshold (equals 200) and gives rise to a level "1" being detected, which is wrong.

Figure 8:
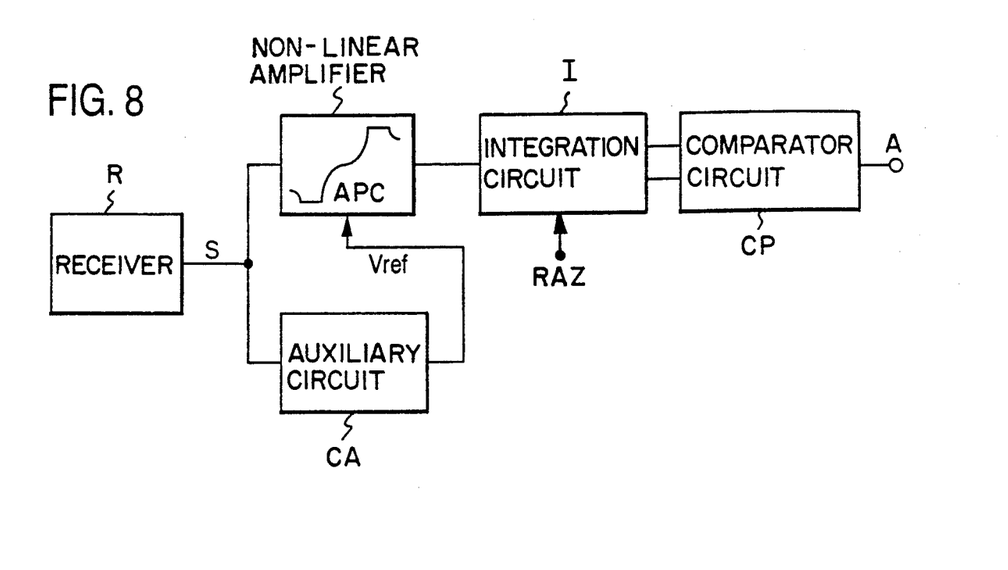
FIG. 8 is a block diagram of a variant circuit for a signal encoded on two levels, the circuit including only one integrator.
Figure 9:
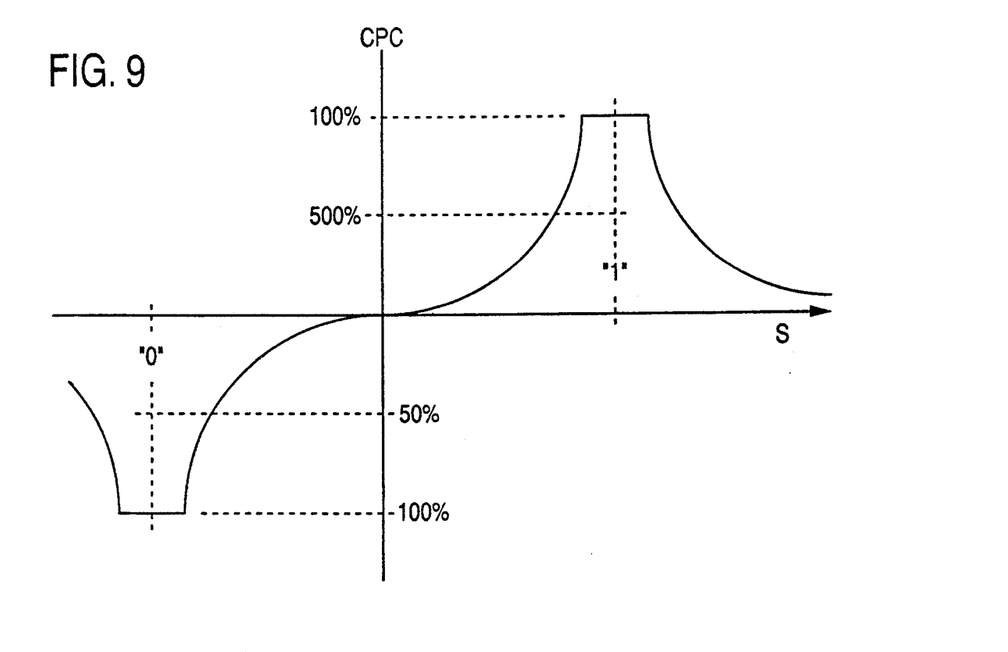
FIG. 9 shows the variation in the weighting coefficient used in the circuit of FIG. 8.

Returning to the invention, in the illustrative case of a logic code having two levels in the signal S, each of the two paths N0 and N1 for processing logic levels "0" and "1" may terminate, as described above, at a respective integrating capacitor C1i. The voltages across the terminals of the two capacitors C1i are then compared at the end of each elementary period in the signal S, and the higher voltage specifies which of the logic levels "0" and "1" has been received. It is also possible to use only one integrating capacitor which is charged by one of the paths and discharged by the other, with its voltage being reset at the beginning of each elementary period in the signal S to a value lying halfway between maximum voltages such that the integrated variation relative to said value indicates, at the end of each period, which is the more probable logic level that should be taken as having been received. This disposition avoids the need to use two capacitors having exactly the same capacitance (Precision capacitors being relatively expensive), and is illustrated by the diagram of FIG. 8. It uses a probability curve which is symmetrical about one half of logic level "1", as shown in FIG. 9.

The filter circuit of the type described is particularly advantageous when the received signal S is accompanied by interference that is short in duration but large in amplitude, and possibly exceeding the amplitude of the signal S per se. Such interference affects the filter output only to a limited extent, and therefore conveys relatively little charge to the integration capacitors.

Figure 10:
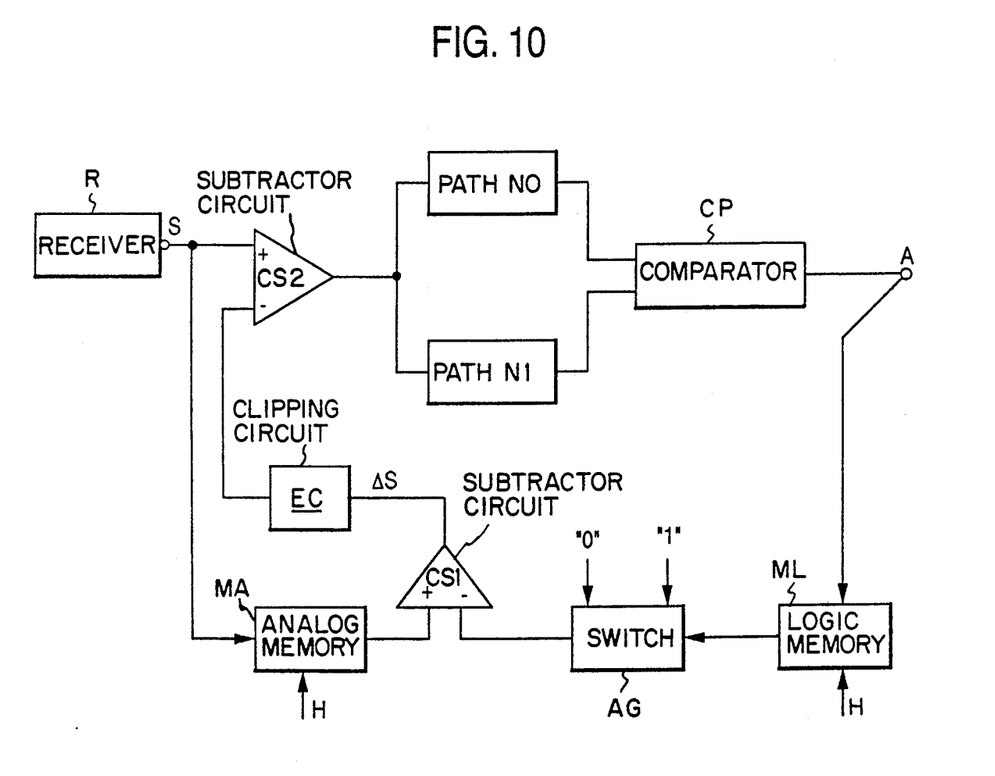
FIG. 10 is a block diagram showing a variant of the circuit in which low frequency noise present on a signal encoded on two levels is compensated.

As for noise which is low in frequency relative to the elementary period of the useful signal S, it may be observed that such noise adds a substantially level DC component throughout the duration of each period. In order to eliminate this cause of error, a compensation circuit may be provided (FIG. 10). This circuit comprises a logic memory ML which stores the logic level indicated by the comparator CP at the output from paths N0 and N1 at the end of each period under the control of a clock signal H (with the signal S being assumed to be a binary-coded signal), and at the same moment, an analog memory MA stores the instantaneous level of the signal S as received after HF filtering, as it would have been delivered by a conventional detector as mentioned above. Depending on whether a "0" or a "1" has been detected in this signal, the low frequency error in the signal received at this moment can be reconstituted by taking the difference in a subtractor circuit CS1 between the analog value stored in the memory MA and a voltage corresponding either to level "0" or else to level "1" generated in the manner explained for the signal Vref and passing through a switch AG which is controlled as a function of the contents of the logic memory ML. The error signal ΔS formed in this way is subtracted from the signal S by a subtractor circuit CS2 interposed between the receiver R and the logic level detection paths N0 and N1. In order to avoid the entire circuit locking up in the event of a detection error leading to correction in the wrong direction, the amplitude of the correction signal ΔS may be limited by a clipping circuit EC.

A variant embodiment of the invention consists in not clipping the input signal to A3 or elsewhere when it reaches its normal level, and allowing it to increase, while applying an increased attenuation effect by increasing the gain of a A4. However, the signal Vid should nevertheless be clipped beyond a certain level in order to guarantee an adequate dynamic range for controlling the drop in gain of the amplifier A3 by means of its gain control input.

The example given is based on simple components and is naturally capable of being modified without going beyond the scope of the present invention. In particular, the response curve which is upwardly concave and substantially exponential in appearance could be obtained by using non-linear amplifiers, with A3 applying an exponential amplifying function to its signal input, while simultaneously applying a logarithmic characteristic to the gain control for reducing gain. Similarly, A4 may be an amplifier having logarithmic gain. These amplifiers may have thresholds applied thereto.

The variation in gain obtained in the amplifier A3 may be obtained by any other means, e.g. by using a divider bridge having components with variable conduction states (diodes, transistors, etc.), or by modifying the operating point of a component, e.g. by modifying the grid voltage of an MOS transistor, thereby changing the resistance of the MOS channel.

An upwards concave non-linear response curve may be obtained by circuits other than a variable divider bridge as described above. For example, a logarithmic operational amplifier may be used with its output fed back to its input via a linear amplifier. Since the product of the gains of the two amplifiers is unity, the linear amplifier therefore performs amplification with an antilogarithmic response curve.

The example described is based on analog processing performed electrically. Naturally, it would also be possible to use high speed digital processing.

Further, the output from the receiver may be other than electrical, e.g. it could be optical, and it could be processed by means of optical circuits, with certain circuits having non-linear effects being capable of performing the "amplitude" filtering. Another way of obtaining variable attenuation of the signal is to use a monochromatic optical frequency from a laser and to inject it into a circuit where the rays are split into two equal beams which are subjected to a controllable time delay specific to each beam, e.g. by applying an electrical field on a light duct, thereby changing its refractive index, and thus the speed of propagation therealong. Vector recombination at the output from the circuit gives rise to a signal that may be modulated from 0% to 100% depending on the relative phase shift. Such circuits are available in the form of integrated circuits.

In addition, the modulated paramiter and/or the type of modulation may be different, either in the receiver or in the amplifiers, which amplifiers may be transducers. Thus, optical frequency modulation may be converted into electrical amplitude modulation.

The invention is applicable, inter alia, to long distance connections over electric cables, optical fibers, radio, etc. For optical receivers where the intrinsic noise due to components such as PIN diodes or avalanche diodes or resistors, transistors, or preamplifiers, limits the minimum reception threshold, the application of such a method enables the thresholds to be very considerably reduced.

I claim:

1. A method of filtering a received modulated digital signal having N logic levels with noise superposed thereon, N being not less than 2, wherein the instantaneous probability of existence of each logic level is converted into a corresponding one of N signals each having an amplitude which is at a maximum value when the value of the received signal is equal to the corresponding logic level and which is decreased by the application of a weighting coefficient as the value of the received signal moves away from the corresponding logic level, each of said N signals is integrated over the duration of an elementary modulation period of the received signal, and the logic level which corresponds to the largest value integral is recognized as the logic level of the received signal.

2. A method according to claim 1, wherein the weighting coefficient varies as a function of the value of the received signal in accordance with a curve which has a maximum value when the received signal is at the corresponding logic level and which is upwardly concave on either side of that maximum value.

3. A method according to claim 1, wherein the weighting coefficient is constant over a predetermined range of received signal values embracing the corresponding logic level.

4. A method according to claim 1, wherein the weighting coefficient corresponding to a given logic level is close to a minimum value for received signal values close to a different logic level.

5. A method according to claim 1, wherein the modulation of the received signal is converted from one form to another.

6. Apparatus for implementing the method according to claim 1, the apparatus comprising:
   N amplitude filter paths to which the received signal is input, each path corresponding to one of said logic levels and comprising an amplifier circuit whose response curve as a function of input signal value has a maximum value when the input signal value corresponds to the corresponding logic level and a value which decreases monotonically on either side of that maximum value;
   an integrator circuit for integrating output signals from the amplifier circuits; and
   a comparator circuit for comparing the integrated signals and indicating, at the end of each elementary period of the received signal, which one of said logic levels is the most probable for the received signal over that period.

7. Apparatus according to claim 6, further including means for supplying to the amplifier circuit of each filter path a reference voltage corresponding to the corresponding logic level.

8. Apparatus according to claim 6, wherein the amplifier circuit of each filter path comprises:
   a first non-linear amplifier whose gain increases as the input signal value increases up to the value corresponding to the corresponding logic level;
   a second non-linear amplifier whose gain decreases as the input signal value increases beyond the value corresponding to the corresponding logic level;
   each of said first and second non-linear amplifiers having the received signal supplied to an input thereof; and
   a gain controlled amplifier having an input connected to an output of the first non-linear amplifier and whose gain is controlled by an output of the second non-linear amplifier.

9. Apparatus according to claim 8, wherein the reference voltage for each filter path is applied to the second non-linear amplifier of that filter path.

10. Apparatus according to claim 6, wherein the integrator circuit comprises a plurality of integrators, each being specific to a respective one of the filter paths.

11. Apparatus according to claim 6, wherein for a received signal having two logic levels, the integrator circuit comprises a single integrator common to both filter paths and actuated symmetrically in opposite directions by respective output signals of said filter paths, the comparator circuit comparing a signal from said integrator with a reference voltage.

12. Apparatus according to claim 6, further including a circuit for adding an error voltage to the received signal, said error voltage being proportional to a difference observed at the end of each elementary period between an amplitude corresponding to a recognized logic level and the actual amplitude of the received signal after HF filtering, said error voltage offsetting the received signal.

* * * * *